US011792734B2

(12) United States Patent
Bohrer

(10) Patent No.: US 11,792,734 B2
(45) Date of Patent: Oct. 17, 2023

(54) POST-EVENT MODIFICATION OF LOCAL CLOCK VALUES IN WATER DISTRIBUTION SYSTEM

(71) Applicant: AMI Investments, LLC, Carrollton, TX (US)

(72) Inventor: Tom Bohrer, Akron, OH (US)

(73) Assignee: McWane, Inc., Birmingham, AL (US)

( * ) Notice: Subject to any disclaimer, the term of this patent is extended or adjusted under 35 U.S.C. 154(b) by 0 days.

(21) Appl. No.: 17/876,948

(22) Filed: Jul. 29, 2022

(65) Prior Publication Data

US 2022/0369233 A1    Nov. 17, 2022

Related U.S. Application Data

(63) Continuation of application No. 17/161,280, filed on Jan. 28, 2021, now Pat. No. 11,438,844.

(51) Int. Cl.
*H04W 52/02* (2009.01)
*H04W 84/18* (2009.01)

(52) U.S. Cl.
CPC ..... *H04W 52/0293* (2013.01); *H04W 52/029* (2013.01); *H04W 52/0277* (2013.01); *H04W 52/0283* (2013.01); *H04W 84/18* (2013.01)

(58) Field of Classification Search
CPC ......... H04W 52/0283; H04W 52/0293; H04W 52/029; H04W 52/0277; H04W 4/38
See application file for complete search history.

(56) References Cited

U.S. PATENT DOCUMENTS

| 9,228,853 B1 | 1/2016 | Brennan |
| 10,317,384 B2 | 6/2019 | Morrow et al. |
| 10,612,216 B2 | 4/2020 | Kennedy |
| 10,669,700 B2 | 6/2020 | Feyling |
| 2005/0172737 A1 | 8/2005 | Bond |
| 2013/0036796 A1 | 2/2013 | Fleury, Jr. et al. |

(Continued)

FOREIGN PATENT DOCUMENTS

| CN | 109889609 A | * | 6/2019 |
| CN | 214344117 U | * | 10/2021 |
| EP | 3329292 A1 |   | 6/2018 |

OTHER PUBLICATIONS

International Search Report and Written Opinion for International Application No. PCT/US2022/014078, dated May 20, 2022 (21 pages).

*Primary Examiner* — Keith Ferguson

(74) *Attorney, Agent, or Firm* — Maynard Nexsen PC; Brian T. Sattizahn

(57) ABSTRACT

A hydrant apparatus may be employed to monitor a water distribution system, and may include a sensor, a processor, and a local clock source. The apparatus may wake from a low power mode to a sensing mode, receive the sensor data, associate the sensor data with a first local clock time, and return the apparatus to the low power mode from the sensing mode. The apparatus may subsequently wake to an operational mode, determine a second local clock time subsequent to the first local clock time, associate an external clock time with the second local clock time, determine an offset for the received sensor data based on the first local clock time and the association between the second local clock time and the external clock time, and transmit the sensor data and the offset to an external monitoring system.

20 Claims, 9 Drawing Sheets

(56) References Cited

U.S. PATENT DOCUMENTS

| | | |
|---|---|---|
| 2013/0212420 A1 | 8/2013 | Lawson et al. |
| 2014/0121999 A1 | 5/2014 | Bracken et al. |
| 2015/0003227 A1 | 1/2015 | Splitz et al. |
| 2015/0308627 A1 | 10/2015 | Hoskins et al. |
| 2016/0033990 A1 | 2/2016 | Luciani |
| 2016/0219805 A1 | 8/2016 | Romney et al. |
| 2018/0320828 A1 | 11/2018 | Lander et al. |
| 2019/0223125 A1 | 7/2019 | Simon |

* cited by examiner

POST-EVENT MODIFICATION OF LOCAL CLOCK VALUES IN WATER DISTRIBUTION SYSTEM

CROSS-REFERENCE TO RELATED APPLICATIONS

This application is a continuation of U.S. patent application Ser. No. 17/161,280 (now allowed), filed Jan. 28, 2021, the disclosure of which is hereby incorporated by reference herein in its entirety.

BACKGROUND

Water distribution systems provide water to homes and businesses within a geographic area. The water is generally treated prior to distribution in order to ensure that it complies with legal, regulatory, and customer requirements relating to the quality and content of the distributed water. Water and other aspects of distribution systems therefore need to be monitored with respect to these requirements.

Known monitoring systems may employ sensors that are distributed throughout the system for measuring operating parameters of the system relating to customer and regulatory requirements. Due to the large geographic area covered by a typical system and the difficulty in accessing some system components, sensors measuring the operating parameter(s) of the system may rely upon wireless communication with a monitoring facility. Monitoring events that cause service disruptions or other issues in the system therefore may involve coordination a signals from different sensors, including timing of various sensed parameters. The large geographic size and scale of a typical water distribution system, as well as the extremely short timescale (e.g., fractions of a second) in which an energy pulse or an acoustic related issue can propagate through a water distribution system, makes determining a location or cause of a localized issue very difficult to begin with. Increasing wireless sensor and/or communication abilities of remote monitoring devices in an effort to address this difficulty necessarily introduces significant costs and/or complexity.

SUMMARY OF THE INVENTION

Example illustrations herein includes an apparatus of a hydrant configured to monitor a water distribution system. The apparatus may include a sensor configured to output sensor data relating to at least one operating parameter of the water distribution system, a processor in communication with the sensor, a local clock source, and a communication interface. The apparatus may also include a memory that includes instructions which cause the apparatus to, at a first time, wake from a low power mode to a sensing mode. While in the sensing mode, the apparatus may receive the sensor data, associate the sensor data with a first local clock time determined by the local clock source, and return the apparatus to the low power mode from the sensing mode. The instructions included on the memory may also cause the apparatus, at a second time subsequent to the first time, to wake from the low power mode to an operational mode. While in the operational mode, the apparatus may determine a second local clock time subsequent to the first local clock time from the local clock source, associate an external clock time with the second local clock time, determine an offset for the received sensor data based on the first local clock time and the association between the second local clock time and the external clock time, and transmit the sensor data and the offset via the communication interface to an external monitoring system.

Example illustrations are also directed to a remote monitoring system for a water distribution system. The system may include a plurality of hydrant apparatuses, with each apparatus corresponding to a hydrant of the water distribution system. The hydrant apparatuses may each include a sensor configured to output sensor data relating to at least one operating parameter of the water distribution system, a processor in communication with the sensor, a local clock source, and a communication interface. The hydrant apparatuses may also each include a respective memory that includes instructions. The instructions may cause a given apparatus to, at a first time, wake from a low power mode to a sensing mode. While in the sensing mode, the apparatus may receive the sensor data, associate the sensor data with a first local clock time determined by the local clock source, and return the apparatus to the low power mode from the sensing mode. The instructions included on the memory may also cause the apparatus to, at a second time subsequent to the first time, wake from the low power mode to an operational mode. While in the operational mode, the apparatus may determine a second local clock time subsequent to the first local clock time from the local clock source, associate an external clock time with the second local clock time, determine an offset for the received sensor data based on the first local clock time and the association between the second local clock time and the external clock time, and transmit the sensor data and the offset via the communication interface to an external monitoring system. The remote monitoring system may further include a central monitoring system in communication with each of the plurality of hydrant apparatuses via the communication interface to receive the sensor data and the offsets from the plurality of hydrant apparatuses. The central monitoring system may be configured to associate the sensor data from the respective hydrant apparatuses based on the offsets and to identify a water system event based on the associated sensor data.

Example methods are also described herein, including methods of monitoring a water distribution system via one or more apparatuses of a hydrant. An example method includes providing an apparatus of a hydrant, the apparatus including a sensor configured to output sensor data relating to at least one operating parameter of the water distribution system, a processor in communication with the sensor, a local clock source, a communication interface, and a memory. The example method further includes waking the apparatus from a low power mode to a sensing mode at a first time and, while in the sensing mode, receiving the sensor data and associating the sensor data with a first local clock time determined by the local clock source and returning the apparatus to the low power mode from the sensing mode. The example method further includes waking the apparatus from the low power mode to an operational mode at a second time subsequent to the first time. The method further includes determining a second local clock time subsequent to the first local clock time from the local clock source, associating an external clock time with the second local clock time, determining an offset for the received sensor data based on the first local clock time and the association between the second local clock time and the external clock time, and transmitting the sensor data and the offset via the communication interface to an external monitoring system, with the determining, associating, and transmitting steps occurring while the apparatus is in the operational mode.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
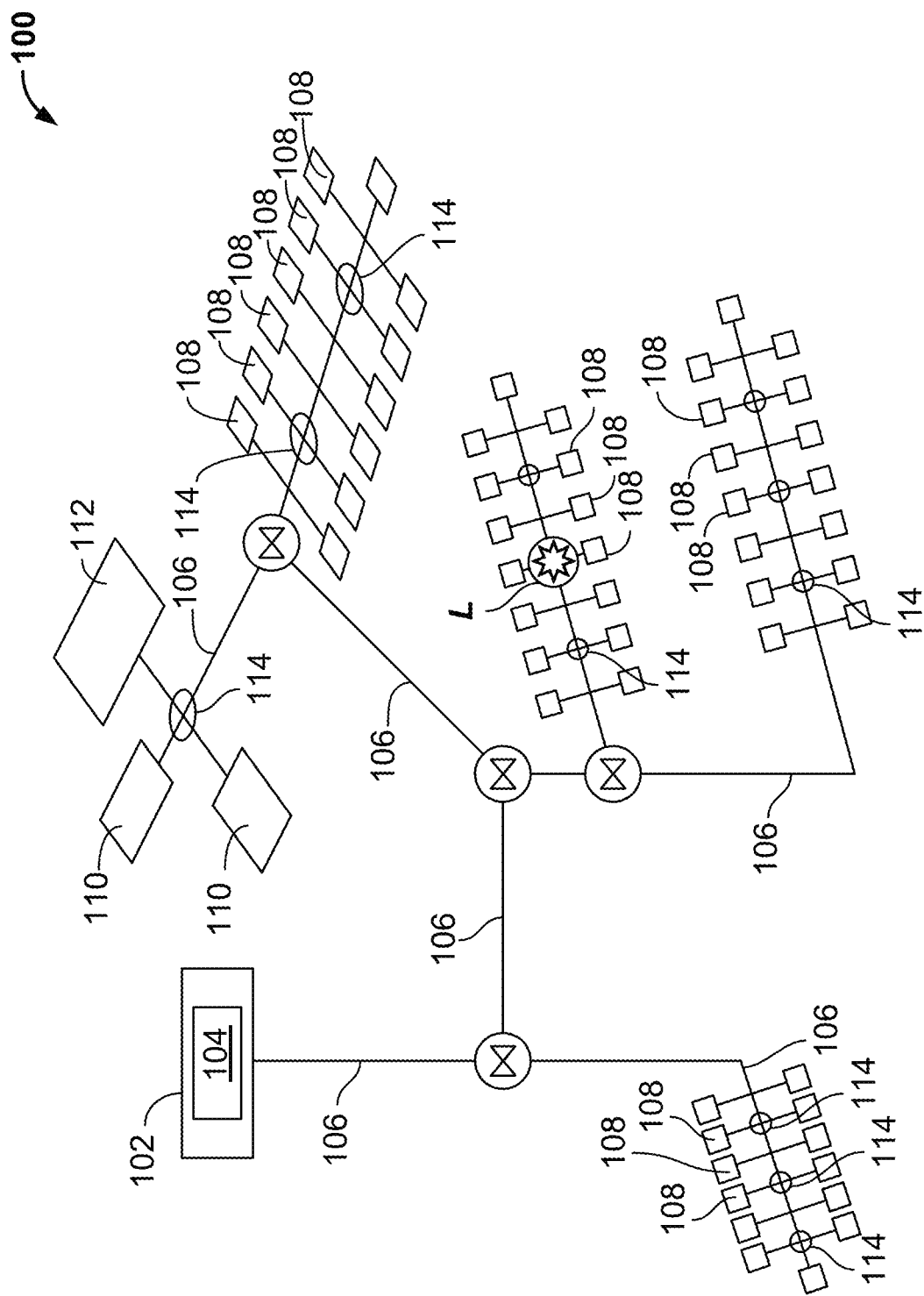
FIG. 1 shows an illustrative water distribution system in accordance with an embodiment of the present disclosure.

A water distribution system is typically a complex set of components (e.g., storage reservoirs, water mains, pumps, valves, hydrants, access lines, etc.) that has been installed and updated over years and often decades. Events that occur within the water distribution systems such as pressure pulses, leaks, and accidents can happen simultaneously at multiple locations within the water distribution system. The effects of these events propagate through the system in unpredictable manners and interact with each other. Further, initial events such as high usage by firefighters or a catastrophic accident often trigger additional events, such as leaks, damage to valves, or release of contaminants (e.g., from walls of mains in response to high flow rates). Thus, events in a water distribution system occur in a diverse and complex environment and often in clusters. The timing and propagation of events is also variable, with some events (e.g., a pressure pulse) occurring on a scale of milliseconds and others (e.g., contaminants) occurring over minutes or other relatively longer periods of time.

Sensors and controls may be distributed throughout the water distribution system. Because much of the water distribution system is buried underground and the materials of system components block RF signals, it is difficult to install, service, and communicate with such sensors and controls. One location that is relatively accessible within the water distribution system is the hydrants. Sensors such as temperature sensors, pressure sensors, acoustic sensors, and the like may be located at suitable locations accessible via the hydrants (e.g., within a cap, bonnet, valve, adjustment nut, etc.) to measure characteristics of the water and the water distribution system. The sensors may be connected to communications hardware located at a suitable location (e.g., within a plastic or polymer enclosure) to facilitate communication with an external wireless network, such as a cellular or mesh network. In some instances, this communications hardware may also be used to relay signals between other sensors and/or control devices within the water distribution system to the external network. In this manner, the hydrants function as key measurement and communication hubs within the water distribution system.

As noted above, events within a water distribution system result in complex propagation patterns due to the nature of the water distribution system and subsequent triggering of additional events. There are thus significant benefits in measuring and controlling such events from multiple geographic locations with simultaneously synchronized data on event timing, including back-tracking across locations over time to better locate the source of the disruption in the network, measuring the speed of progression of an event across the network, and measuring the rate of dissipation of the strength of a disruption as it moves across the network over time. With enough data on events, statistical analyses and machine learning may be applied to better understand the nature of the events, the behavior and operation of the water distribution system (which is often unknown, or only known based on intuition and institutional knowledge), and measures that may be taken to mitigate events in the particular water distribution system.

Many events occur and propagate quickly, for example, energy or acoustic-related events that may propagate in the hundredths of a second time frame, and understanding those events requires data that is accurate to the thousandth or tenths-of-thousandth of a second. Sensors and communication hardware of a water distribution system are difficult to access even at a hydrant, and do not have access to a continuous power source (e.g., except in limited and expensive circumstances such as a water-powered generator, local hardware must be powered by a battery) or even recharging. Accordingly, numerous optimizations are performed within the hydrant-located hardware, such as employing power-efficient hardware (e.g., including on-board clocks, which may operate at a frequency significantly lower than clocks on non-power limited systems) and limiting power-consuming actions such as complex data analyses and wireless communications. Further, on-board clocks (e.g., within microprocessors or specialty clock chips) all drift in their accuracy for a variety of reasons, including temperature fluctuations and individual manufacturing variances. Since obtaining sensor data is significantly less power consuming than communications operations, sensor data may be obtained for extended periods of time (e.g., hours) between activation of the communication hardware. The only timing reference available between these activations is the local clock source, which may drift from a precise external time source (e.g., from a communication network or GPS signal).

Multiple hydrant sensing devices will often lose their real-time clock synchronization to varying degrees over time, causing such devices to clock the same real-time events differently with increasing divergence over time. While synchronizing to an external clock source is possible, doing so on a frequent basis (even a couple of times a day) has a significant battery usage cost in the context of hydrant-installed sensors. In an embodiment, each respective onboard clock may be synchronized to the external clock source after sensor measurements are made, when the communication hardware accesses the external clock source. Sensor values and/or other data about the water distribution system (e.g., opening of a valve, etc.) are initially associated with a local clock source. When the external clock source is obtained and synchronized with the local clock source, an offset is determined for each particular local clock source vis-à-vis the external clock source. Other determinations such as calculation of a drift value for the local clock source may also be performed. These values are provided with the underlying sensor and other data and local clock timing associations, allowing all collected information to be compared and analyzed with a high level of timing accuracy across the entire water distribution system. In one example, an offset value may be provided by transmitting as separate data, in addition to associated sensor data and locally-determined clock time(s). In another example, an offset value may be provided indirectly by modifying sensor data at the apparatus based upon a determined offset, i.e., clock time(s) associated with sensor data may be modified at the apparatus based upon a determined offset, and the modified sensor data with updated clock times may then be provided. Example external monitoring systems may generally normalize sensor readings across different apparatuses to a common (e.g., high accuracy) external clock time, so that event propagations can be correlated to the same external clock time across multiple apparatuses, even when such events are propagating at a high speed across the water distribution system.

Referring now to FIG. 1, a water distribution system 100 is depicted in accordance with some embodiments of the present disclosure. The system 100 may include a water treatment facility 102 that includes a central monitoring system 104. It will be understood that a central monitoring system may be located at other suitable locations, such as other "central" locations and/or as an application accessed via communication networks via logins, applications, and other similar interfaces. Water is provided to the water treatment facility 102 from a water source (not depicted). Water treatment facility 102 treats the water that is provided from the water source such that it complies with legal, regulatory, and customer requirements related to water content and quality. The water that is provided by the water treatment facility 102 may be provided to water mains 106, such as via one or more elevated storage reservoirs (e.g., water towers or other storage basins), as well as a variety of pumps and/or valves. The water mains 106 may distribute the water to customers such as residential customers 108, business customers 110, and industrial customers 112.

The central monitoring system 104 may receive information from remote monitoring devices that are located throughout the water distribution system 100 in order to ensure that water that is delivered to different locations throughout the water distribution system 100 complies with the legal, regulatory, and customer requirements, as will be discussed below. Based on this information, the central monitoring system 104 may report problems within the water distribution system 100 and suggest or automatically execute corrective action such as needed repairs at a location of the water distribution system 100 and/or modifications to operations of components within the water distribution system (e.g., booster pumps, release valves, pressure reducing valves, shut-off valves, water distribution routing valves, local storage, and the like). Merely by way of example, the central monitoring system 104 may identify locations where there is an unexpected loss of pressure within the water distribution system 100. Based on this information, the location where an inspection or repair needs to be made may be pinpointed accurately. As another example, a change in pressure may be determined to likely due to a particular cause, such as firefighter use of a hydrant, periods of high usage (e.g., usage spikes during mornings), pressure hammers, valves unexpectedly or suddenly opening or closing, accidents, leaks, water theft, pipe blockages and other similar causes. Service operators may be dispatched and/or remote components such as booster pumps and valves may be actuated to compensate for the change in pressure (or other characteristics), such as by increasing pressure to a particular part of the system with a booster pump or shutting off water flow to a portion of the system where a catastrophic accident has likely occurred. In a similar manner, the central monitoring system 104 may monitor other characteristics of the water, such as leaks, temperature, material or chemical content, at different locations throughout the water distribution system 100. Based on these characteristics, the central monitoring system 104 may identify a location where water quality does not comply with legal, regulatory, or customer requirements. Suggested actions for a service operator or automated actions may be employed, for example, by isolating a source of the non-compliant water and diverting water from other sources to end users. In any such circumstances, end users and other interested parties (e.g., public health employees, firefighters, police, private repair contractors, etc.) may be contacted to provide warnings and suggested actions (e.g., boil water if consumed in next 2 hours, dispatch to location, and the like).

In addition, central monitoring system 104 may monitor aspects of the water distribution system 100 over time, for example, to determine usage patterns or other changes to the water distribution system 100. As described herein, synchronization of remote (e.g., battery powered) distributed sensors and other devices throughout the water distribution system 100 may facilitate the accurate comparison of complex system-level service events throughout the water distribution system 100. Interactions between distributed components can be monitored over time to identify optimizations to the water system. For example, a portion of the water distribution system 100 may be located at a relatively higher elevation than other portions of the water distribution system. During non-peak hours, the system pressure may be adequate to service the portion of the water distribution system, while a booster pump may be utilized during peak periods such as early morning and early evening. The operation of the booster pump may be optimized based on localized and distributed pressure readings throughout the portion of the water distribution system, for example, to ramp up at certain times at a certain rate, and similarly, to ramp down at particular times. Operations may further be optimized based on other factors such as service events (e.g., firefighter access to a hydrant, which may be identified such as by a sensor(s) of the hydrant or an application initiated by firefighters), such as by modifying the operation of the booster pump and/or valves to ensure suitable pressure to the hydrant and local area. Such monitoring can also identify possible failures of equipment, such as pressure-reduction valves between geographic elevations. These failures can result in damage to the water distribution system or to residential or commercial buildings (carrying potential liability to water distribution entities), if such failures are not addressed in a timely manner.

An exemplary service event location L is schematically represented in FIG. 1. The service event location L may represent the location of an issue affecting delivery of water within the system, or otherwise impacting performance of the system 100. Merely by way of example, the service event occurring at location L may be a leak or water pressure event, e.g., a pressure drop in a main 106, a detection of a foreign object or contaminant in the water supply, or the like. As will be described further below, the central monitoring system 104 may receive data from monitoring devices distributed throughout the system 100 and/or external sources. Merely as examples, the monitoring devices and/or external sources may provide water pressure data, water temperature data, acoustic level data, or contaminant level data, as examples. Such data may be used at the central monitoring system to determine an event such as a water leak, failure or imminent/potential failure of a component in the system 100, or contamination of water, merely as examples. The central monitoring system 104 may also deploy service personnel or take other corrective action with respect to the system 100 and components thereof in response to the received data.

Remote monitoring devices may be located anywhere convenient in the system 100 for monitoring various aspects of the system 100. In the example illustrated, a plurality of fire hydrants 114 are distributed throughout the system 100, which are equipped with remote monitoring devices. Remote monitoring devices may alternatively or in addition be provided at the customer locations 108, 110, and/or 112, and throughout the water distribution system 100 (e.g., within water mains, at valves, booster pumps, etc.). However, as described in more detail herein, in the illustrated examples at least some of the remote monitoring devices are located at the fire hydrants 114 of the water distribution system 100. This may provide some advantages, for example, that the party that owns or manages the water distribution system 100 is likely to have access to and at least partial control over the fire hydrants 114 and the operation thereof.

Turning now to FIGS. 2-5, examples of an apparatus or remote monitoring device are illustrated and described in further detail. More specifically, FIGS. 2-5 illustrate hydrants 114a, 114b, 114c, and 114d (collectively, 114), each having respective remote monitoring devices 116a, 116b, 116c, and 116d (collectively, 116).

Figure 2:
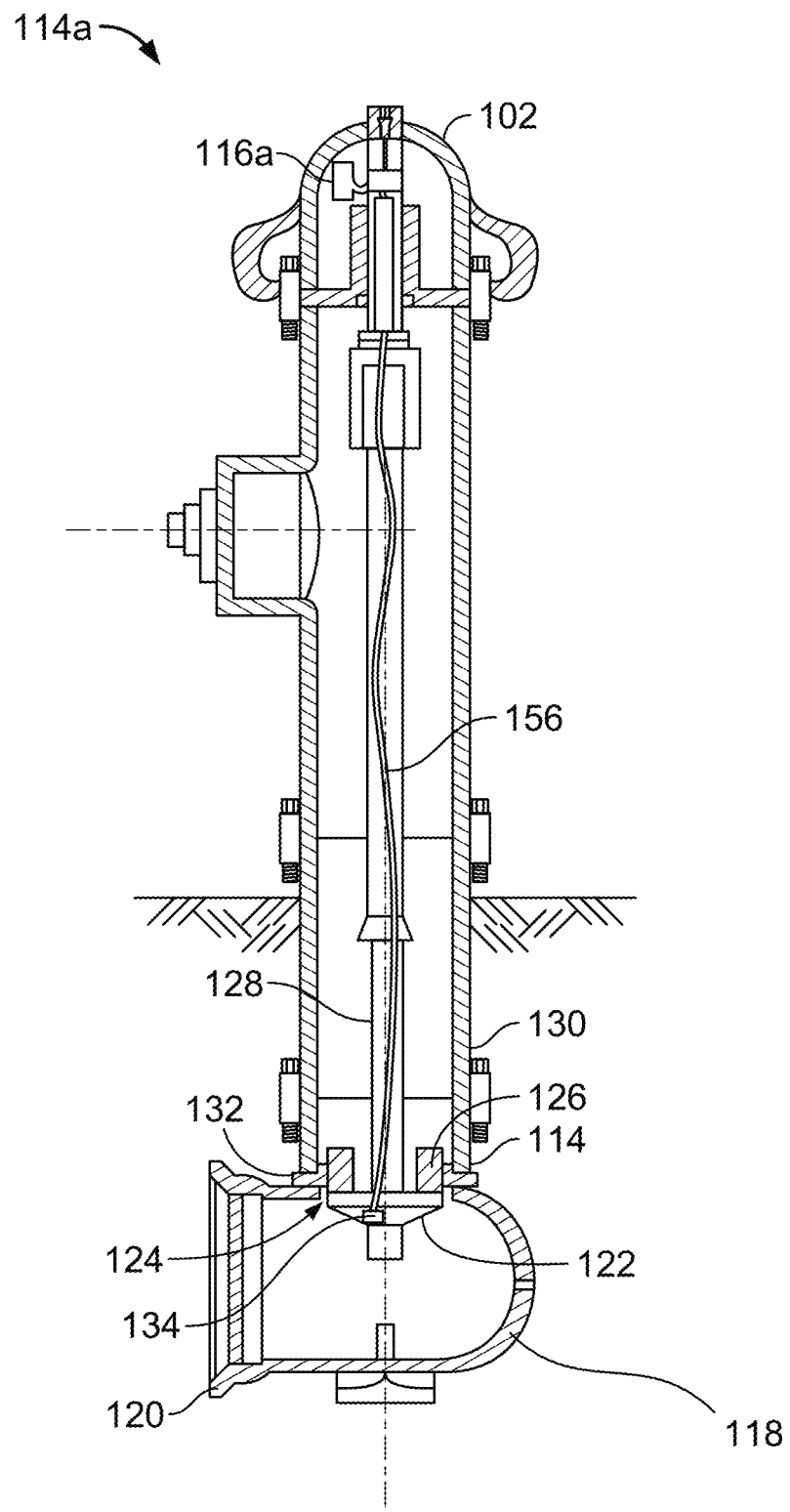
FIG. 2 shows an example monitoring apparatus for a dry-barrel hydrant, in accordance with some embodiments of the present disclosure.

Referring now to FIG. 2, dry-barrel hydrant 114a is illustrated having a remote monitoring device 116a. The dry-barrel hydrant 114a may generally include a shoe 118 that connects to water main 106 (not shown in FIG. 2) via a flange 120. A valve of the fire hydrant 114a may include a lower valve plate 122 and a valve seat 124. Under normal conditions when water is not being provided to the fire hydrant 114a, the lower valve plate 122 may provide a force upon the valve seat 124 such that it creates a seal with seat ring 126 and an upper valve plate (not depicted). A valve stem 128 may be coupled to the lower valve plate 122 such that a user of the fire hydrant may release the seal between the valve seat 124 and the seat ring 126, allowing water from the water main 106 to be provided to the fire hydrant 114a via barrel 130. In some embodiments, seat ring 126 may engage with a drain ring 132, such that the valve stem 128, seat ring 126, and valve (e.g., including lower valve plate 122 and valve seat 124) may be selectively removed and serviced at the fire hydrant 114a. The drain ring 132 may generally allow water to drain from the barrel 130, e.g., into surrounding soil when the valve seat 124 is closed, which is particularly important for hydrants in northern climates to prevent hydrant barrels from freezing and cracking in cold weather. In warmer climates, drainage holes may be sealed to prevent contaminated water in the soil from entering the hydrant. When servicing a hydrant, such as for removing the stem 128, a valve in front of the hydrant (not shown) is typically closed to prevent pressure from reaching the hydrant, thereby allowing internal components to be removed, repaired or replaced. The remote monitoring device 116a communicates via a wired connection 156 with a sensor(s) 134 located on an exposed surface or within a water capture area (e.g., provided by a channel or reservoir within an enclosure of the lower valve plate 122) of the lower valve plate 122, as will be discussed further below. The valve (e.g., including sensor(s) 134) may be accessed and serviced as necessary, for example, replace one or more components of the valve or add additional sensing functionality.

In a wired configuration such as that depicted in FIG. 2, the sensor(s) 134 may be powered by a power source (e.g., a battery of remote monitoring device 116a), and in some embodiments, may include local processing hardware such as to perform local measurements calculations without invoking the operations of the remote monitoring device 116a (e.g., comparison of a measurement such as pressure to a threshold) except according to a schedule or under particular circumstances (e.g., invoking an interrupt at the remote monitoring device 116a to wake the remote monitoring device). In other embodiments, the sensor(s) 134 may simply be wired with power and I/O to the remote monitoring device 116a, such that all processing of data from sensor(s) 134 occurs at the remote monitoring device 116a.

Figure 3:
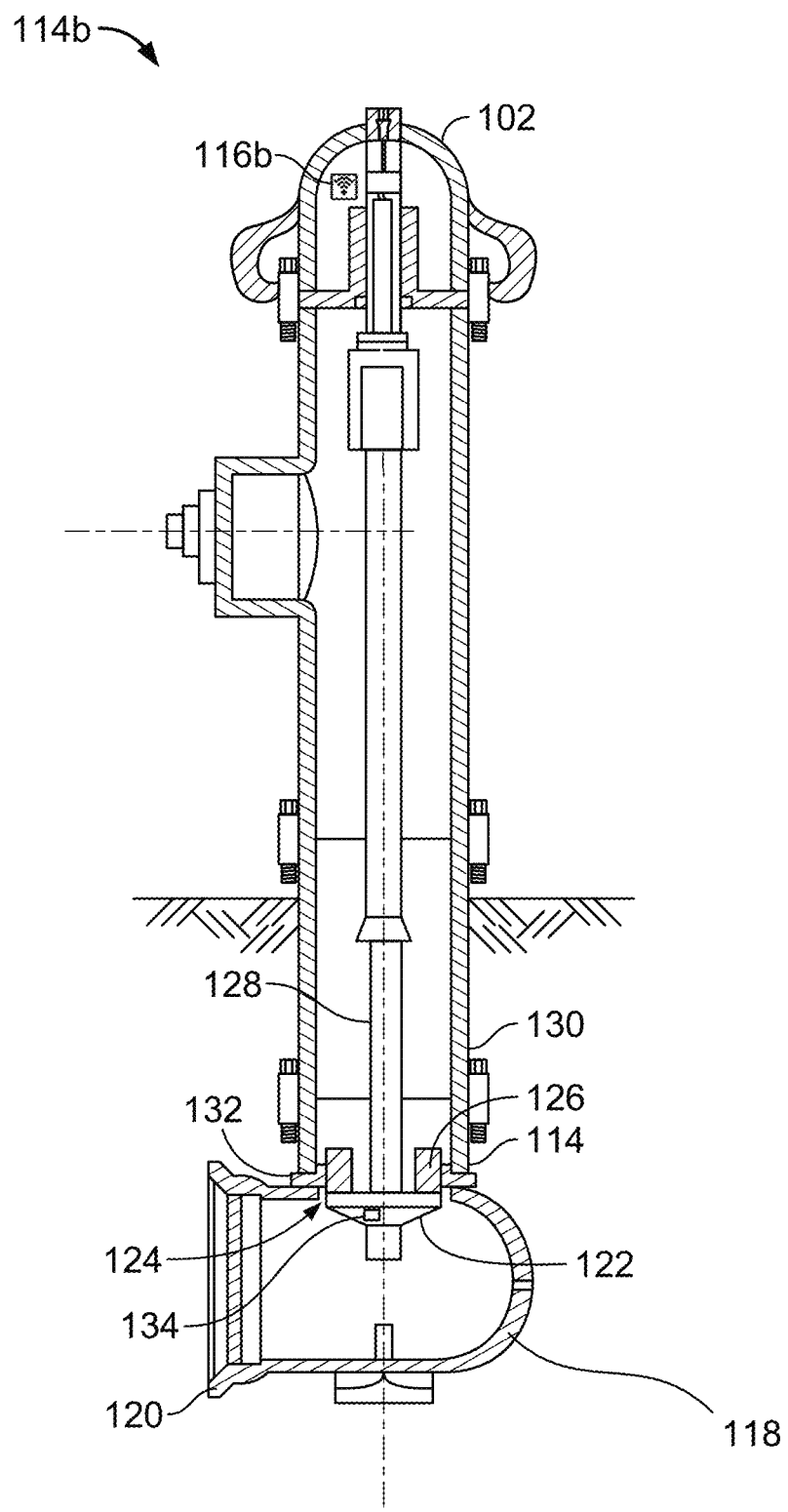
FIG. 3 shows an example monitoring apparatus for a dry-barrel hydrant, in accordance with some embodiments of the present disclosure.

Turning now to FIG. 3, another dry-barrel hydrant 114b is illustrated. Hydrant 114b is identical to hydrant 114a illustrated in FIG. 2, with like reference numbers indicating like features. The remote monitoring device 116b of hydrant 114b, however, employs a wireless connection with the sensor(s) 134, in contrast to the wired arrangement of hydrant 114a. Such a configuration includes local processing at sensor(s) 134 to perform local measurements, calculations, and comparisons, and to engage in wireless communications with the remote monitoring device 116b. The operations of the respective sensor packages (e.g., sensor(s) 134 and supporting processing and communication circuitry as required) for measurement, processing, and wired and wireless communication with remote monitoring devices (e.g., remote monitoring devices 116a and 116b) are further described in U.S. Pat. No. 10,317,384, filed Sep. 21, 2016, and entitled "Remote Monitoring of Water Distribution System," which is incorporated herein in its entirety.

Figure 4:
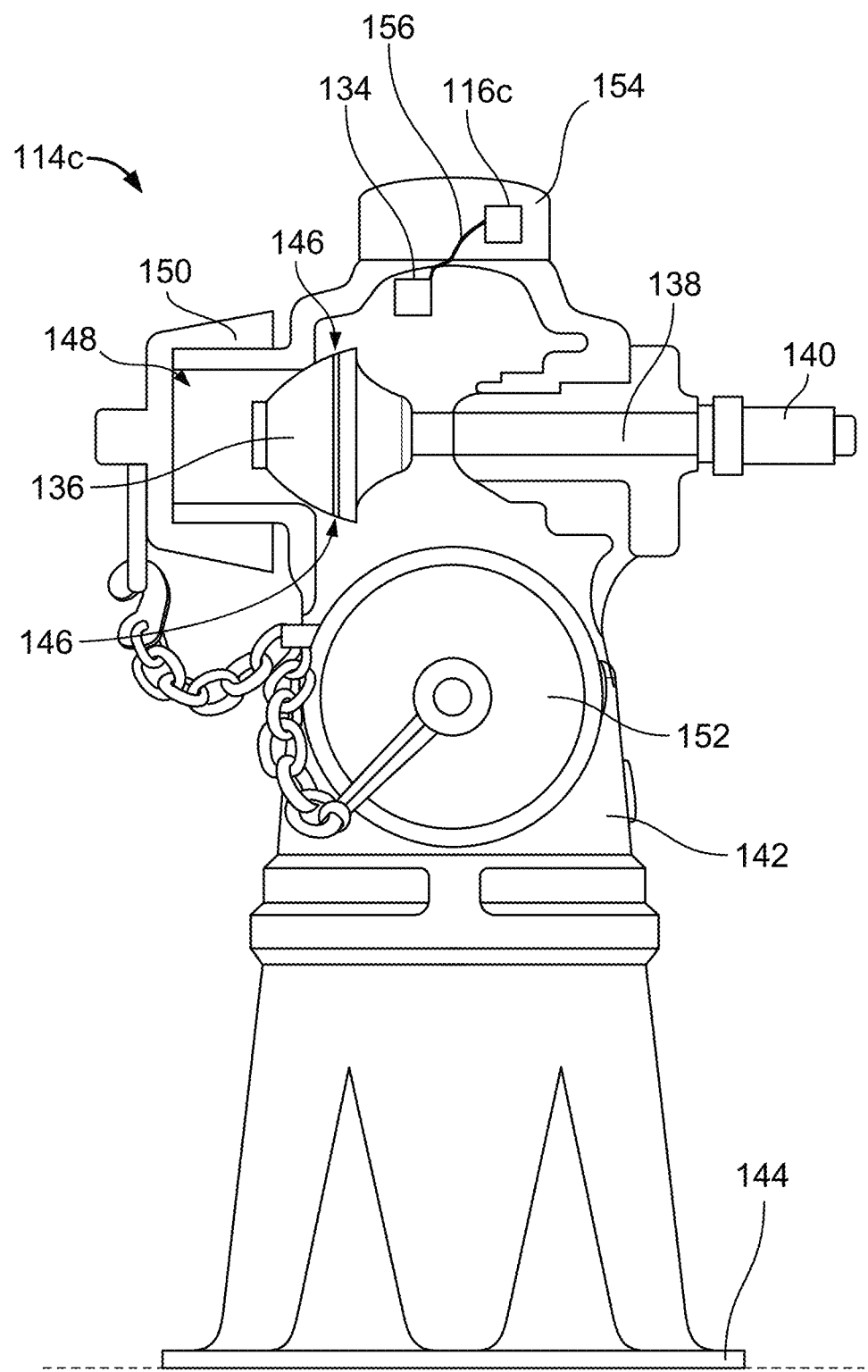
FIG. 4 shows an example monitoring apparatus for a wet-barrel hydrant, in accordance with some embodiments of the present disclosure.

Referring now to FIG. 4, another example hydrant 114c is illustrated. The wet-barrel hydrant 114c may have a main valve 136 that is connected via a valve stem 138 to attachment nut 140. The hydrant 144c may be mounted via a lower flange to water main 106 (not shown in FIG. 4), such that water may be received within a main barrel 142 defining an interior volume of the hydrant 114c. The attachment nut 140 may be rotated to allow water to flow from the barrel 142 through a valve seat 146. Accordingly, water may pass through an outlet 148. A cap 150 may be provided to protect the valve 136 from the external environment. The hydrant 114c may also have a secondary outlet 152 communicating with the barrel 142. The hydrant 114c includes a remote monitoring device 116c contained within a housing 154 secured to an upper portion of the hydrant 114c. The remote monitoring device 116c utilizes a wired connection to a sensor(s) 134.

Figure 5:
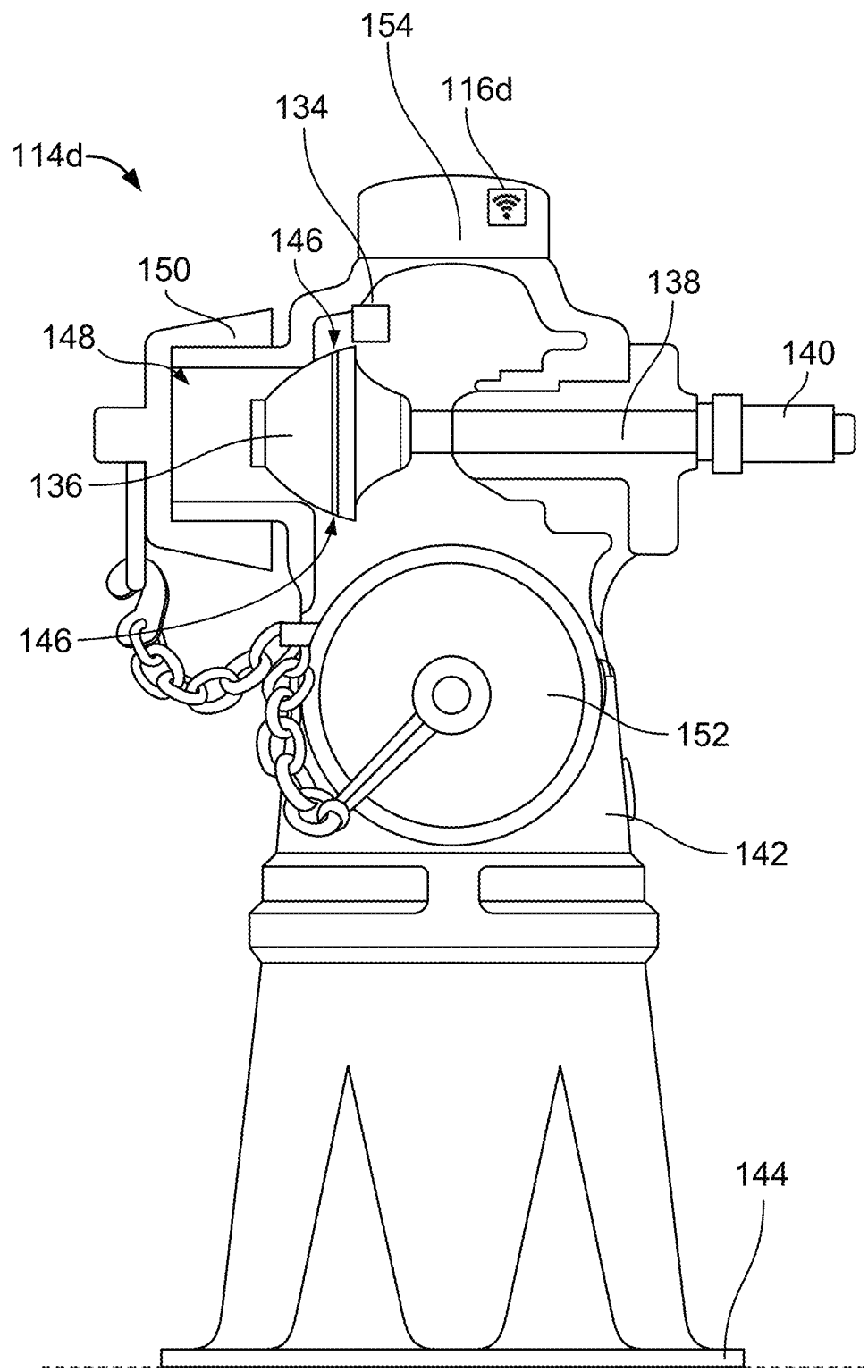
FIG. 5 shows an example monitoring apparatus for a wet-barrel hydrant, in accordance with some embodiments of the present disclosure.

Turning now to FIG. 5, another wet-barrel hydrant 114d is illustrated. Hydrant 114d is identical to hydrant 114c illustrated in FIG. 4, with like reference numbers indicating like features. The remote monitoring device 116d of hydrant 114d, however, employs a wireless connection with the sensor(s) 134 in contrast to the wired arrangement of hydrant 114b.

In the various example hydrants 114 illustrated in FIGS. 2-5, a remote monitoring device 116 communicates with one or more sensors 134 that are positioned such that they may measure characteristics of the water that is distributed through the water main 106 of the water distribution system 100. For example, the water main 106 (not depicted in FIG. 2 or 3) may be coupled to the shoe 118 via flange 120 of the dry-barrel hydrants 114a and 114b. Similarly, the water main 106 (not depicted in FIG. 4 or 5) may communicate water to the lower flange 144 of the wet-barrel hydrants 114c and 114d. The sensor(s) 134 may be located in any suitable location that is in contact with the water provided by water main 106 (e.g., at any location of the hydrant 114). Merely as examples, in a dry-barrel hydrant 114a/114b the sensor(s) 134 may be located at an exposed surface of the lower valve plate 122, as illustrated in FIGS. 2 and 3. In a wet-barrel hydrant 114c/114d, the sensor(s) 134 may be located at a location with access to the water within the barrel 142, as illustrated in FIGS. 4 and 5.

The remote monitoring device 116a and/or the sensor(s) 134 may include any suitable components to provide for measurement of characteristics of water provided by the water main 106. In one embodiment, the sensor(s) 134 includes a plurality of sensors that measure characteristics of the water such as pressure, temperature, turbidity, heave, material content (e.g., total dissolved solids), biological content, chemical content (e.g., chlorine), or any other suitable characteristics. Sensors at the hydrant may also measure characteristics of the hydrant and/or water distribution system. For example, sensors may capture the opening and closing of valves of a hydrant. As another example, sensors located at the hydrant (e.g., ultrasonic sensors, hydrophones, etc.) may also directly or indirectly identify characteristics of the pipe and distribution system, such as cracks, leaks, obstructions, debris, corrosion, loose couplings, and the like. It will be understood that sensor(s), remote monitoring device(s), and communications circuitry may be located and configured in a variety of manners, such as having multiple sensors located at different portions of the hydrant that communicate with the remote monitoring device (e.g., including communication and processing circuitry) via wired and/or wired connections. Exemplary configurations include those described and depicted in in U.S. Pat. No. 10,317,384, filed Sep. 21, 2016, and entitled "Remote Monitoring of Water Distribution System," U.S. Provisional Patent Application No. 63/086,192, filed on Oct. 1, 2020, and entitled "Hydrant Valve Stem Sensor System," U.S. Design patent application No. 29/754,783, filed on Oct. 14, 2020, and entitled "Hydrant Monitoring Cap," U.S. patent application Ser. No. 17/012,625, filed Sep. 4, 2020, and entitled "Remote Monitoring of Water Distribution System," U.S. Pat. No. 10,612,216, filed Sep. 6, 2018, and entitled "Apparatus and Method to Mount Sensors Below a Main Valve of a Fire Hydrant," and U.S. Pat. No. 10,669,700, filed Sep. 5, 2018, and entitled "Wireless Communication Electronics Storage Apparatus and Method of Mounting the Same in a Dry Barrel Hydrant," each of which is incorporated herein by reference in its entirety.

In some embodiments (not depicted in FIGS. 2-5), sensors located external to the hydrant may communicate via the communication circuitry of the hydrant devices, such that the hydrant device may function as a relay from such additional sensors, including sensors located within water mains and valves, sensors located in hydrant nozzle caps or hydrant bonnets, water consumption meters attached to the hydrant (such as used by construction contractors when filling a water truck from the hydrant), and/or devices that may be inserted into the water system such as measurement pigs that travel through the system. Clock synchronization as described herein may be performed based on timestamps attached to data transmitted by such sensor(s) and/or device(s) located external to the hydrant.

The measured characteristics may be processed at the sensor(s) 134 and/or remote monitoring device 116, or some or all of the outputs of the plurality of the sensors may be provided to another device (e.g., a communication network device, as will be discussed further below) for further processing. In some embodiments such as those illustrated in FIGS. 3 and 5, the sensor(s) 134 may communicate with the remote monitoring device 116 via a standardized (e.g., WiFi, ZigBee, Synapse SimplySNAP, Bluetooth, Bluetooth low energy, Bluetooth mesh, etc.) or proprietary wireless communication protocol operating at frequency such as 900 MHz, 2.4 GHz, or 5.6 GHz. In other embodiments, the sensor(s) 134 may communicate via a wired connection, for example as depicted in FIG. 2 or 4.

In some examples, such as those illustrated in FIGS. 2-5, the remote monitoring device 116 may be located at a location of fire hydrant 114 that is located above ground, for example, at a location within a bonnet, bonnet extension (or "neck"), attachment nut, nozzle cap, stem collar, or an external housing attached to the fire hydrant 114. However, it will be understood that remote monitoring device 116 may be located at any suitable location of fire hydrant 114, including an interior or exterior surface of fire hydrant 114. In addition, in some embodiments, the remote monitoring device 116 and sensor(s) 134 may be integrated as a single component.

Figure 6:
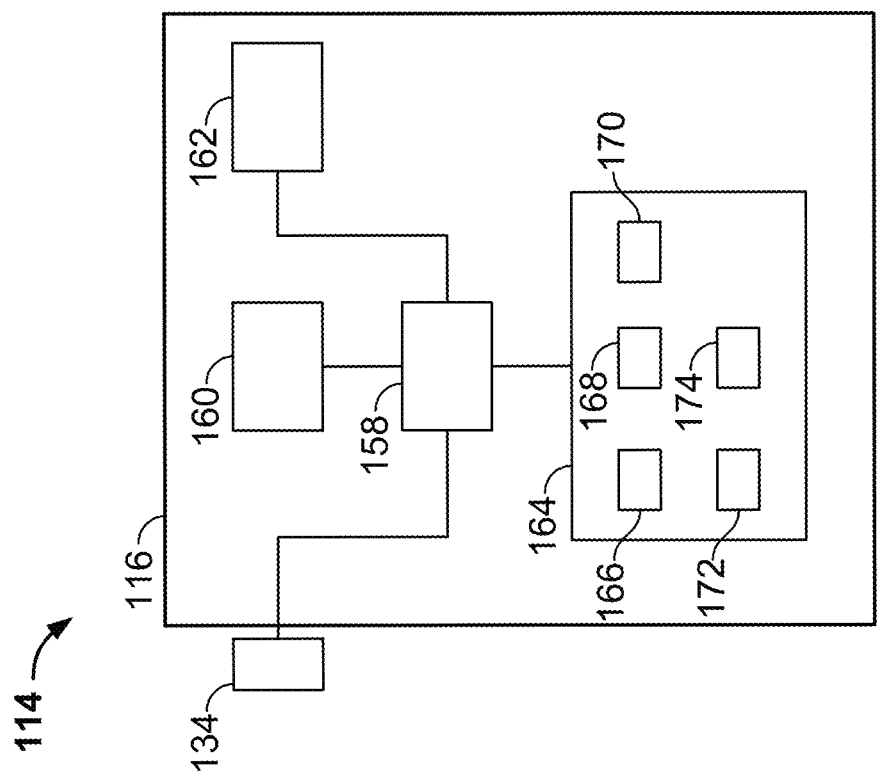
FIG. 6 is a schematic illustration of an example electronic system of a monitoring apparatus, in accordance with some embodiments of the present disclosure.

Turning now to FIG. 6, an example remote monitoring device 116 is illustrated schematically. The remote monitoring device 116, as noted above in FIGS. 2-5, may be installed in or on a hydrant 114, and may be in communication with one or more sensors 134 that are configured to measure or collect data relating to water system operating parameters. The remote monitoring device 116 and sensor(s) 134 may together be included in an apparatus for monitoring the system 100 at any of the hydrants 114. The remote monitoring device 116 may also include a processor 158 in communication with a local clock source 160, a communication interface 162, and a memory 164. Each of these components may be powered by a local power source, such as a local battery.

The local clock source 160 provides clocking for the components of the remote monitoring device 116, such as the processor 158. The local clock source 160 may also be used to determine a time that is associated with data received from the sensor(s) 134. As will be discussed further below, the local clock source 160 may be independent of an external or high precision clock source, except to the extent the local clock source may occasionally be corrected or updated, or synchronized with an external clock source. The local clock source 160 generally provides a locally-determined time, e.g., determined at the hydrant 114, which is associated with data collected by way of the sensor(s) 134. The local clock source 160 operates at a relatively low frequency and precision compared to external clock sources to limit power consumption from the battery of the remote monitoring device 116, which may be located in a difficult to service location and thus cannot be replaced or serviced easily. The frequency of the local clock source 160 may be relatively low compared to external clock sources that are coupled to power sources or capable of regular recharging, for example, one or more orders of magnitude less than the frequency of the external clock source. In one example, a frequency of the local clock source is less than 50 kilohertz (kHz).

A time measured by each local clock source 160 of each remote monitoring device 116 in a water distribution system may drift over time, even between periodic synchronization events with external clock sources. Depending on how often synchronization occurs, which requires power-consuming activation of communications hardware, this drift may be on the scale of milliseconds, hundreds of milliseconds, or even seconds depending on the specifications of the particular local clock source 160 and the frequency of synchronization. Different local clock sources may have different specifications synchronization times, and/or rates of clock drifting, and further, the clock sources may be deployed over years and may degrade (i.e., drift may get worse) over time. Accordingly, remote monitoring devices 116 throughout a water distribution system 100 may measure divergent times of same events and occurrences, and may do so in unpredictable ways. This may create particular challenges for system-level events, especially energy or acoustic related events, that propagate through a water distribution system, often on a scale of milliseconds.

For example, a service event such as an equipment malfunction (e.g., of a valve, pump, pipe, pressure reduction valve between geographic elevations, etc.), firefighting event, accidental burst of a hydrant, or pressure hammer, may propagate through the water distribution system on the scale of milliseconds, tens of milliseconds, or hundreds of milliseconds, depending on the proximity of the remote monitoring device and/or other monitored equipment to the service event. Further, because water distribution systems are built, updated, and added to over dozens of years and often with disparate equipment, this propagation is inherently complex and is unique to each water distribution system. As discussed above, even the remote monitoring devices and/or other connected equipment of the water distribution system may be disparate and installed over years. In view of these complexities and the limitations of local clock sources, monitoring and analysis of system-level service events is hindered by the limitations of the local clock sources. For example, even experienced personnel are forced to rely on intuition and rules of thumb for a particular system. Even modern machine learning systems have difficulty identifying useful patterns in such data. The communication interface 162 may facilitate communication with the central monitoring system 104, e.g., via wireless communication. Accordingly, the remote monitoring device 116 may be in communication with a communication network (not shown). In some examples, the remote monitoring device 116 may also be in communication with other communication devices such as communication interfaces 162 of other fire hydrants 114 and/or other equipment (e.g., valves, pumps, other monitoring devices, etc.) within the water distribution system 100. As described herein, the communication interface 162 may include a wired or wireless communication interface that is compatible with the remote monitoring device 116 as well as one or more additional wireless communication interfaces for communicating with the communication network and central monitoring system 104, such as a cellular communication network or a mesh communication network. In an exemplary embodiment of a cellular communication network, the communication interface 162 may communicate in any suitable manner, such as via internet protocol data communication or short message system (SMS) messages. In an exemplary embodiment of a mesh communication system, data may be transmitted to the central monitoring system 104 via the mesh network or using a data collection procedure (e.g., using a service vehicle to survey the remote monitoring devices 114 at hydrants 114).

In some examples, the remote monitoring device 116 includes a global positioning satellite (GPS) device, e.g., a GPS receiver or transceiver, in communication with one or more GPS satellites (not shown), e.g., to determine a location of the remote monitoring device 116. The GPS device may be incorporated as part of the communication interface 162 of the remote monitoring device 116. Moreover, in such approaches the remote monitoring device 116 may also obtain an external or high-precision clock time by way of the GPS satellite(s). Location data may thus also be transmitted by the remote monitoring device 116, e.g., to the central monitoring system 104.

The processor 158 may include any suitable processing device such as a general purpose processor or microprocessor executing instructions from memory, hardware implementations of processing operations (e.g., hardware implementing instructions provided by a hardware description language), any other suitable processor, or any combination thereof. In one embodiment, a processor may be a microprocessor that executes instructions stored in memory. Memory (e.g., memory 164) includes any suitable volatile or non-volatile memory capable of storing information, such as RAM, ROM, EEPROM, flash, magnetic storage, hard drives, any other suitable memory, or any combination thereof.

The remote monitoring device 116 may also be provided with a power source or battery, e.g., that is incorporated into the device 116 or otherwise installed with the device 116 at the hydrant 114 (not shown in FIG. 6).

The memory 164 may be a computer-readable medium tangibly embodying instructions executable by the processor 158, as may be convenient for implementing example methods discussed herein. In the example illustrated in FIG. 6, the memory 164 includes sensing instructions 166, low power instructions 168, analysis instructions 170, communication instructions 172, and/or clock synchronization instructions 174. The sensing instructions 166 may facilitate the collection of sensor data, e.g., from sensor(s) 134 of hydrant 114. Low power instructions 168 may cause the processor 158 and/or other components of the remote monitoring device 116 to reduce or cease power consumption, and may also initiate a waking of the remote monitoring device 116 (e.g., upon occurrence of events, or periodically after expiration of a predetermined time period), as will be discussed further below. Analysis instructions 170 may include one or more standards or thresholds relevant to data collected by sensor(s) 134, such that the remote monitoring device 116 may analyze sensor data and determine a presence of a potential issue or service disruption in the system 100. Communication instructions 172 may facilitate communication between the remote monitoring device 116 and, for example, central monitoring system 104, e.g., via wireless communication protocols. The clock synchronization instructions 174 may cause the remote monitoring device 116 to obtain an external clock time from an external clock source, and/or to provide locally determined times associated with collected data, e.g., to the central monitoring system 104. As will be discussed in further detail below, the external clock time may be a relative high precision clock time that is used to standardize or synchronize times associated with different data sets, e.g., between data collected from different hydrants 114, or between data received from a hydrant 114 and data otherwise collected at the central monitoring system 104.

Figure 7:
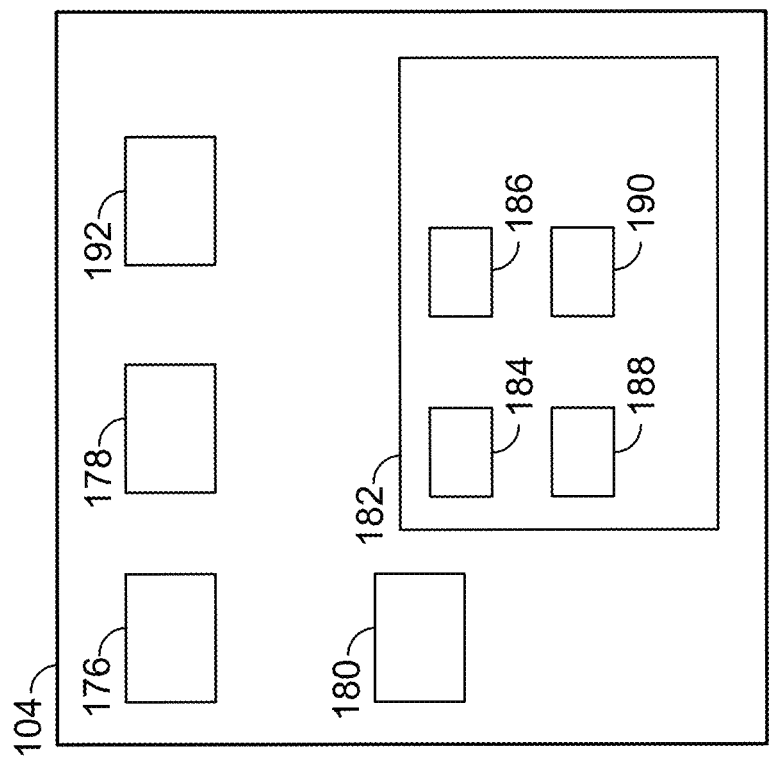
FIG. 7 a schematic illustration of an example central monitoring system receiving data from a hydrant apparatus, in accordance with some embodiments of the present disclosure.

Turning now to FIG. 7, central monitoring system 104 is illustrated schematically and described in further detail. Although the central monitoring system 104 is described as "central," it will be understood that the central monitoring system may be distributed in a suitable manner (e.g., local monitoring zones, distributed applications, etc.) so long as it is capable of processing data from a variety of remote monitoring devices 116 and/or other remote equipment of the water distribution system or a portion thereof. The monitoring system 104 may include a communication interface for sensor data 176, a communication interface for other/external data and controls 178, a processor 180, and a memory 182. The memory 182 of the central monitoring system may be a computer-readable medium tangibly embodying instructions executable by the processor 180. Merely as examples, the memory 182 may include clock synchronization instructions 184, analysis instructions 186, graphical user interface instructions 188, and control instructions 190, as will be described further below. The clock synchronization instructions 184 may facilitate the use of an offset between an external clock time and a local clock time, e.g., determined by a hydrant 114, to synchronize timing of data collected from a hydrant 114 and other sources. Analysis instructions 186 may include relevant threshold(s) for parameters measured by sensors 134 or other operating parameters of the system 100, as may be useful in determining whether a potential service issue is present in the system 100. Graphical user interface instructions 188 may facilitate interaction of service personnel with the central monitoring system 104, e.g., to allow use of a graphical user interface, as will be described further below. Control instructions 190 may facilitate operation of the central monitoring system 104, e.g., to allow a user or service personnel to take corrective action in response to issues identified in received data, e.g., data received from a hydrant 114.

Generally, the remote monitoring device 116 may gather sensor data collected via the sensor(s) 134 and associate the data with a local clock time determined by the local clock source 160. The remote monitoring device 116 may also determine an offset from the local time associated with the data based on an external (e.g., high-precision) clock source such as from a GPS signal or external communication network, such that the data from the hydrant is time-normalized to the external clock source. In some embodiments, in addition to the offset, a measure of the drift of the local clock source may be determined, for example, based on comparisons of previously associated local clock values and external clock values. The offset and/or local clock time may be further adjusted, or the drift measurement may also be stored for transmission and later analysis by the central monitoring system. Data from the remote monitoring devices 116 may be provided to the central monitoring system 104, which further normalize the data time, for example, based on different local time localization techniques (e.g., based on information about the methodology used to locally normalize the timing associated with particular data). Accordingly, data collected by multiple hydrants 114 may be synchronized to a same time standard or clock source, thereby enhancing the ability of the central monitoring system 104 to analyze and compare data received from various locations in the system 100.

The remote monitoring device 116 may, during normal operation, generally remain in a reduced or low power mode, where usage of a battery or other local power source of the remote monitoring device 116 is relatively reduced to conserve battery life. During this low power mode, the local clock source 160 remains active but the other components of the remote monitoring device are largely inactive. At a periodic interval the processor 158 enters a sensing mode in which it activates the minimal necessary operations for short periods of time such that sensor(s) 134 may collect data relating to the water system, e.g., pressure, temperature, and/or other parameters as described herein. In some examples, a periodic interval may be relatively short, e.g., every 500 ms, every second, or every minute, merely as examples. However, the periodic interval may be any that is convenient, and may be significantly longer in some approaches, for example every twelve hours, or once per day. In the sensing mode, the remote monitoring device 116 generally may process data from the sensor(s) 134 and associate the data with a local clock time as determined by the local clock source 160. For example, the data may be compared to thresholds of triggering events. In the absence of triggering events (e.g., a measured parameter exceeding a threshold or a rate of change of a measured parameter exceeding the threshold), the remote monitoring device 116 may return to the low power mode until the next occurrence of the sensing mode. When a triggering event occurs, the remote monitoring device 116 may perform additional operations, such as temporarily increasing the frequency of the sensing mode (e.g., to more frequently capture data that may be associated with an event) or enter an operating or operational mode. In this manner, the remote monitoring device 116 generally collects data from the sensor(s) 134 and associates data with locally determined time, while minimizing battery or power consumption to the extent possible. It should be noted that a sensor may have a "settling time" upon being brought from a low-power state/mode to an operational state/mode, during which time sensor readings may be inaccurate. Accordingly, it may be necessary to delay readings until after the settling time has passed. Merely as one example, a sensor may have a settling time of 20 milliseconds, and thus readings would be delayed (upon activation or waking from a low power mode) for a greater time than the settling time, e.g., 23 milliseconds, to allow increased accuracy of sensor readings. In some examples, it may be beneficial to maintain the sensor in a powered or operational state for an extended period (e.g., 2-3 minutes) to allow collection of continuous readings and avoiding the need to wait for settling times between readings. Further, some sensors or components of the remote monitoring device 116 may have different activation and/or settling times. For example, a GPS device or radio (as may be incorporated into communication interface 162) may require a relatively longer activation or settling period, e.g., on the order of several seconds, in comparison to a cellular radio, e.g., on the order of several milliseconds. Moreover, different types of sensors associated with the remote monitoring device 116 may employ different sampling rates. Merely by way of example, it may not be necessary to sample water temperature as frequently as water pressure, as water temperature typically changes more gradually than water pressure. Accordingly, where a sensor is measuring a parameter where higher-speed sampling is useful, the remote monitoring device 116 or components thereof may remain on or activated while samples are taken.

The remote monitoring device 116 may also transition to an operational mode, in which the remote monitoring device 116 performs more complex operations, associates timing information of data determined from the local clock source 116 with external timing data, and communicates with components of the system 100 beyond the hydrant 114, e.g., to provide data collected by the sensor(s) 134. Accordingly, subsequent to the gathering of data from the sensor(s) 134 by the remote monitoring device 116, the remote monitoring device 116 may wake from the sensing mode or the low power mode to the operational mode. The remote monitoring device 116 may wake from the low power mode or sensing mode to the operational mode at a defined period, in response to events detected by the remote monitoring device 116, or in response to a triggering by central office 104 of the system 100. In examples where the remote monitoring device 116 wakes periodically from the low power mode or sensing mode to the operational mode at after expiration of a defined period, the period may be any that is convenient. Typically, the period may be relatively longer than a period associated with the waking of the remote monitoring device 116 from the low power mode to the sensing mode. Merely as one example, a remote monitoring device 116 may wake approximately once every minute from a low power mode to a sensing mode, while waking to the operational mode no more than once every twelve hours.

The remote monitoring device 116 may generally consume power in the low power mode and sensing mode at reduced rate(s) compared to an operational mode in which the remote monitoring device is actively powering additional hardware, performing more complex operations, and communicating data. In one example approach, the remote monitoring device 116 consumes power in the low power mode at a substantially reduced rate in comparison to the operational mode, e.g., no more than 1% of the electrical power consumed by the remote monitoring device 116 in the operational mode. Additionally, in some example approaches the sensing mode may consume power at a rate that is greater than the rate of power consumed in the low power mode, while still less than the rate of power consumed in the operational mode. The sensing mode may thus represent an intermediate power usage mode, e.g., in which the remote monitoring device 116 generally performs certain limited activities, and then returns to the low power mode absent detection of some event or issue in which the remote monitoring device 116 is brought to the operational mode. This reduction in power usage may be due at least in part to reduced usage of certain power-drawing components of the remote monitoring device 116. As noted above, when the remote monitoring device 116 is not in the operational mode, i.e., while in the low power mode and/or sensing mode, certain components of the remote monitoring device, e.g., the GPS radio of communication interface 162, may turn on infrequently or not at all. In an example, while in a low power mode the GPS radio of the remote monitoring device 116 generally does not turn on; the remote monitoring device may "wake" to the sensing mode periodically, e.g., once every few seconds, and wake to the operational mode even less frequently, e.g., approximately once every twelve hours, to perform certain periodic operations. It may be possible for the remote monitoring device 116 to wake even less frequently to the operational mode, e.g., once every month. In the sensing mode, the remote monitoring device 116 may obtain and/or analyze sensor data collected at the hydrant 114, activate a GPS radio of the remote monitoring device 116 to obtain a position of the device 116 and/or hydrant 114, or may use the GPS radio to obtain an external clock time. Additionally, a microprocessor of the remote monitoring device 116, e.g., processor 158, may limit aspects of the remote monitoring device 116 that are drawing power while in the low power and/or sensing mode. In one example, the processor 158 runs only its own clock in low-power mode, i.e., a timer that essentially deactivates all other electrically-powered activity of the remote monitoring device 116 until the timer expires. Alternatively or in addition to the limiting of activity of the remote monitoring device 116 in the low power mode, a microprocessor such as processor 158 may be run more slowly in the low power mode than in the sensing mode and/or operational mode, thereby reducing usage of electrical power by the remote monitoring device 116 in the low power mode in relation to the sensing mode and/or operational mode, respectively.

The local clock times gathered by the local clock source 160 of the remote monitoring device 116 may be used to synchronize data with an external or high-precision clock time. For example, the remote monitoring device 116 may receive an external clock time from a communication network, local GPS hardware, the central monitoring system 104, or other source, and determine an offset for the received sensor data based on the local clock times determined by the local clock source 160. In these examples, the remote monitoring device 116 may associate the local clock time and the external clock time to determine an offset of the local clock time, and thus, to normalize the local time associated with pressure measurements collected during the sensing mode. In other example approaches, the central monitoring system 104 may collect local clock times from one or more hydrants 114, determine an offset relating the local clock time(s) to an external or high-precision clock time, and provide the offset to the remote monitoring device(s) 116.

An external clock used to determine the external clock time generally has a higher degree of precision or accuracy than the local clock times determined by the remote monitoring devices 116. In one example, the frequency of an external clock source providing the external clock time is at least one order of magnitude greater than a frequency of the local clock source of the remote monitoring device 116, and in many instances multiple orders of magnitude greater. In one example approach, the remote monitoring device 116, to associate the local clock source time to the external clock source time, may acquire the external clock time within a predetermined number of cycles of the external clock, or within a predetermined period of time, after a transition of the local clock source. Additionally, there may be a limitation to how quickly an external clock time may be obtained, and as a result it may be necessary to incorporate this delay into any offset between an external clock time and a local clock time. Merely by way of example, where the remote monitoring device 116 requires 3 microseconds of time to obtain an external clock time, this delay may be added to an offset between the external clock time and local clock time that is calculated. Once the local clock source is associated with external clock source, each data point associated with the local clock source may then be associated with timing of the external clock source, such as by normalizing the time determined by the local clock source to the external clock source or transmitting the data from the sensor(s), the local clock source value, and the offset between the local clock source and the external clock source. Additionally, the local clock source may be re-synchronized to the external clock source going forward. It should be noted that as an offset is applied to correct local times, more recently adjusted times tend to be more accurate/reliable than older adjusted times. Additionally, rate(s) of drift may not be linear over time, as they may vary due to various externalities, such as with temperature changes. Typically, clock drift between different devices may be in a same direction (e.g., each device falls further behind over time), although rates of drift will vary depending on different externalities, e.g., temperature.

Figure 8:
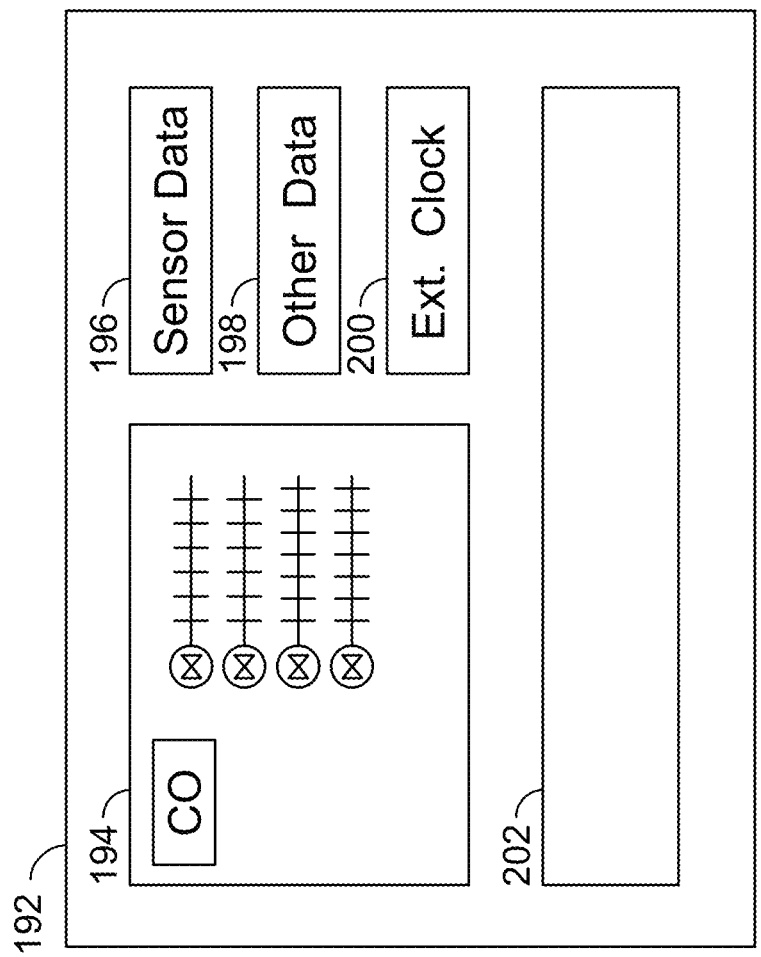
FIG. 8 illustrates an example graphical user interface of a monitoring system, in accordance with some embodiments of the present disclosure.

Referring now to FIG. 8, an example graphic user interface (GUI) 192 is described in further detail. As noted above, the GUI 192 may be provided by a display, e.g., a touchscreen, and may provide visual, audible, and/or other information relating to the system 100. The GUI 192 may also facilitate responses by system personnel at the central monitoring system 104 to events occurring in the system 100, e.g., deployment of service personnel, actuating valves in system 100, or the like. The GUI 192 may include a main display area 602 having a schematic representation or map of the system 100, including the water mains 106, customers 108, 110, and 112, hydrants 114, and any other components of system 100. The display area 602 may also provide information relating to service personnel, e.g., locations of service vehicles. The GUI 102 may also include additional display areas 196, 198, 200 as shown to display sensor data received from hydrant(s) 114, external data, and an external clock source, respectively. The GUI may further include an auxiliary display area 202 for providing additional information, e.g., warnings of detected issues, or any other information that may be useful for monitoring system 100. The GUI may provide a technician or other personnel with a complete system-level view of sensor data that has been normalized to reduce effects of drift from local clock sources, e.g., with each sample or parameter from each remote measurement device and/or other system hardware normalized to a common high-precision time scale. In this manner, the technician or other personnel can view real time or historical events at a system level. For example, once an event is identified, the event can be replayed at a slow motion rate, such that the technician can view how measured parameters incrementally change as the event propagates through the system as well as responses to mitigating responses (e.g., modification of operation of valves, pumps, etc.).

Figure 9:
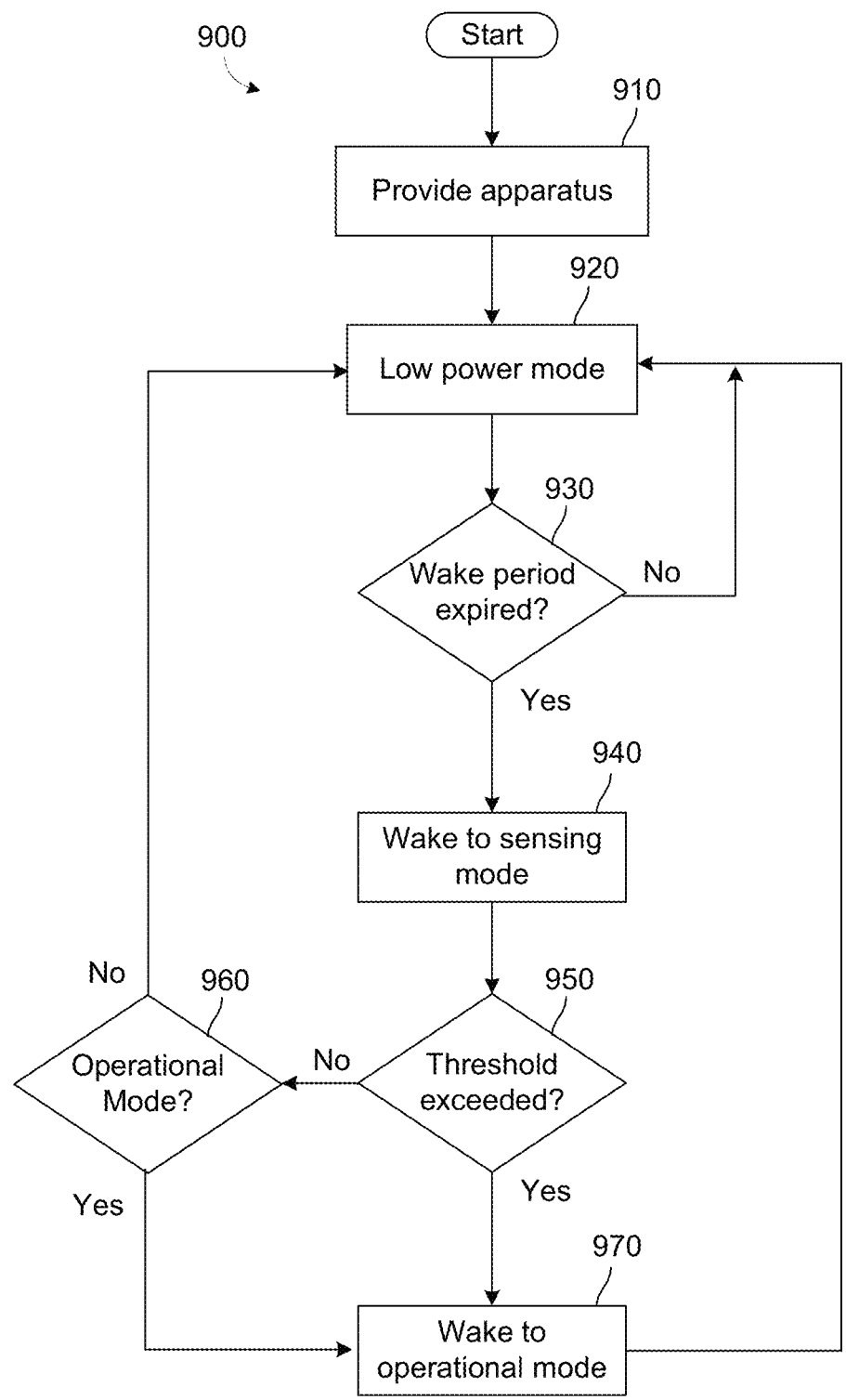
FIG. 9 illustrates a process flow diagram for an example method of monitoring a water distribution system, according to some embodiments.
Figure 10:
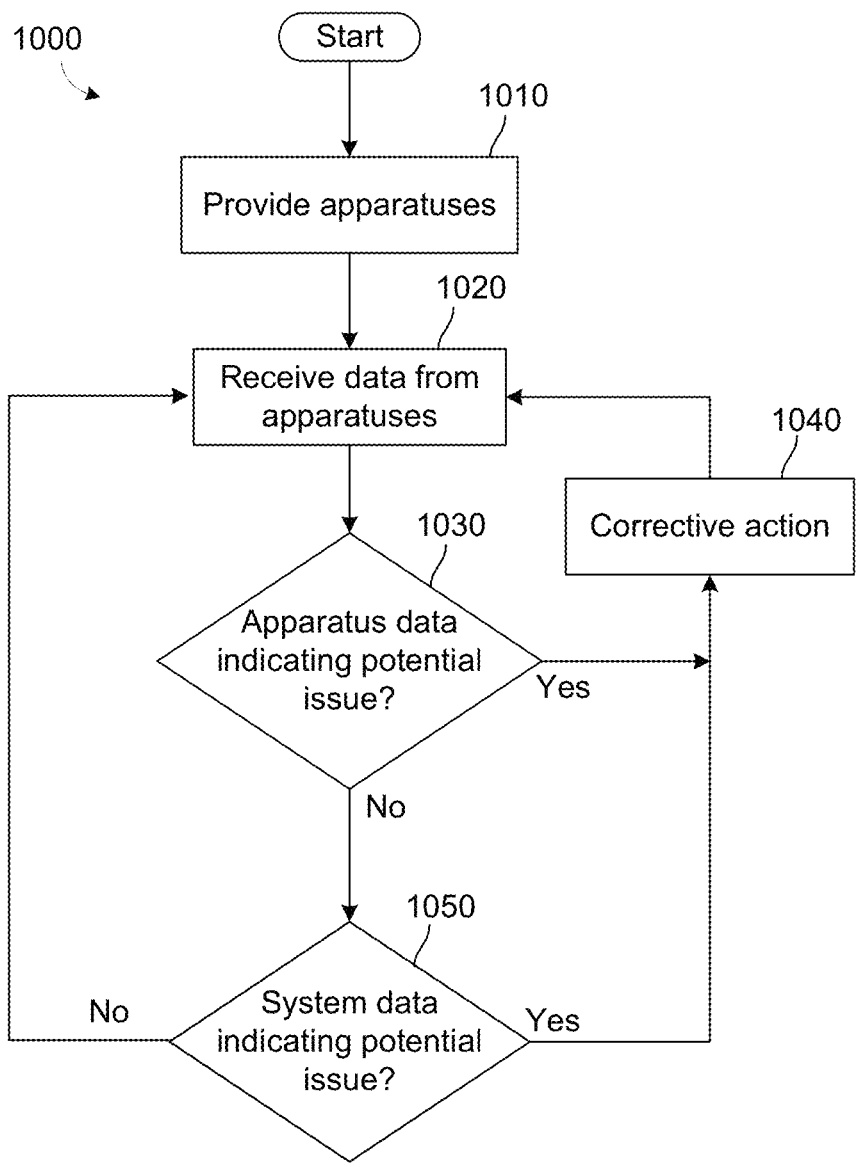
FIG. 10 illustrates a process flow diagram for another example method of monitoring a water distribution system, according to some embodiments.

Turning now to FIGS. 9-10, example methods associated with a monitoring apparatus or system, e.g., in a water distribution system as described above, are described in further detail. Generally, FIGS. 9-10 depict exemplary steps for designing and implementing a water distribution and/or monitoring system in accordance with some embodiments of the present disclosure. Although FIGS. 9-10 are described in the context of the water distribution systems at issue in the present disclosure, it will be understood that the designs, components, configurations, methods, and steps described herein and in FIGS. 9-10 may be applied to any suitable monitoring systems. Additionally, although a particular order and flow of steps is depicted in FIGS. 9-10, it will be understood that in some embodiments one or more of the steps may be modified, moved, removed, or added, and that the flow depicted in FIGS. 9-10 may be modified.

Referring now to FIG. 9, a process 900 of monitoring, e.g., a water distribution system, is described. Process 900 may begin at block 910, where an apparatus of a hydrant may be provided. For example, a hydrant apparatus may include a remote monitoring device 116 and sensor(s) 134. As noted above, the apparatus may further include processor 158, local clock source 160, communication interface 162, and memory 164.

Proceeding to block 920, a low power mode of the apparatus may be initiated. For example, as discussed above, remote monitoring device 116 may employ a reduced power consumption or "sleep" such that the sensor(s) 134 only wakes to collect data at predetermined times, or periodically. Process 900 may then proceed to block 930.

At block 930, process 900 may query whether a wake period has expired with respect to the low power mode of the remote monitoring device 116. If the wake period has not yet expired, process 900 may proceed to block 920, such that the remote monitoring device 116 remains in the low power mode. Alternatively, if the wake period has expired, process 900 may proceed to block 940.

At block 940, remote monitoring device 116 may wake to a sensing mode, where sensor data is received from the sensor(s) 134 and associated with local clock time as described herein. Process 900 may then proceed to block 950.

At block 950, process 900 queries whether a threshold has been exceeded associated with the collected sensor data. In some example approaches, the remote monitoring device 116 may, upon waking to the sensing mode, may additionally compare collected data with appropriate threshold(s) associated with the parameters monitored by the sensor(s) 134. It should be noted that central monitoring system 104 may also determine whether threshold(s) are exceeded based upon data received from one or more hydrants 114. Moreover, other information may also be collected by central monitoring system 104 that may be used to determine that a threshold has been exceeded, such as a notification of a leak, weather events, earthquake, or any other external event potentially affecting performance of water distribution system 100. If at block 950 it is determined that a relevant threshold has been exceeded, process 900 may proceed to block 960. If no threshold has been exceeded, process 900 may proceed to block 960, where it is determined whether the operational mode should be entered to perform periodic operations such as clock synchronization and data transmission. If the operational mode is not to be entered, processing may return to step 920 at which the low power mode of the remote monitoring device 116 is initiated again.

At block 970, remote monitoring device 116 may wake to the operational mode, e.g., to take action responsive to the threshold exceeded as determined at block 950 and/or to perform periodic operations such as clock synchronization, data analysis, and communications. As noted above, remote monitoring device 116 typically may wake to the operational mode less frequently, e.g., no more than once every twelve hours, than it wakes from the low power mode to the sensing mode, e.g., once every minute. In the operational mode, remote monitoring device 116 may determine a local clock time and associate an external clock time, e.g., as received from central monitoring system 104, from a GPS satellite, or other source external to hydrant 114, with the local clock time. The remote monitoring device 116 may determine an offset between the local clock time and external clock time, and transmit the collected sensor data and the offset or a normalized clock time associated with the data. At the conclusion of the operational mode, processing may return to step 920.

Turning now to FIG. 10, another example process 1000 is illustrated for monitoring a system, e.g., water distribution system 100. Process 1000 may begin at block 1010, where one or more apparatuses are provided, e.g., to hydrant(s) 114. Proceeding to block 1020, data may be received from the hydrant(s) 114 and/or other system components, e.g., as collected by sensor(s) 134. Process 1000 may then proceed to block 1030.

At block 1030, process 1000 may query whether apparatus data, i.e., received from the hydrant(s) 114, indicates a potential issue requiring corrective action. Merely as one example, where data from multiple sensors indicate that an event has occurred at a particular location, process 1000 may determine some corrective action such as modifying the operation of pumps and/or valves, and proceed to block 1040 to determine the appropriate corrective action. Corrective action may be implemented by way of the GUI 192 of the central monitoring system 104. As part of block 1040, the central monitoring system 104 may collect additional data, e.g., from other hydrants 114 or external sources, to determine appropriate corrective action. Corrective action may also include deploying service personnel, e.g., to a location L (see FIG. 1) determined from the received data.

If process 1000 determines at block 1030 that no potential issue is ascertained from the apparatus data, process 1000 may proceed to block 1050. At block 1050, process 1000 may query whether a potential issue may be determined from external data, i.e., other than that received from the remote monitoring device(s) 116. External data indicating a potential issue, e.g., notification of a weather event, earthquake, customer complaints, or the like, may be used to determine that corrective action may be necessary, in which case process 1000 may proceed to block 1040. Alternatively, if no such potential issue is indicated based upon received external data, process may proceed back to block 1020, or may end.

As described above in the various example illustrations, the system 100, as well as processes 900 and 1000, may generally facilitate synchronizing clock times across multiple remote monitoring devices 116. As a result, sensor readings or data across the system 100 may be normalized to a common and high accuracy external clock time. Accordingly, event propagations can be correlated to the same external clock time across multiple apparatuses, even when such events are propagating at a high speed across the water distribution system 100.

The foregoing is merely illustrative of the principles of this disclosure and various modifications may be made by those skilled in the art without departing from the scope of this disclosure. The embodiments described herein are provided for purposes of illustration and not of limitation. Thus, this disclosure is not limited to the explicitly disclosed systems, devices, apparatuses, components, and methods, and instead includes variations to and modifications thereof, which are within the spirit of the attached claims.

The systems, devices, apparatuses, components, and methods described herein may be modified or varied to optimize the systems, devices, apparatuses, components, and methods. Moreover, it will be understood that the systems, devices, apparatuses, components, and methods may have many applications such as monitoring of liquids other than water. The disclosed subject matter should not be limited to any single embodiment described herein, but rather should be construed according to the attached claims.

What is claimed is:

1. A remote monitoring system for a water distribution system, the remote monitoring system comprising:
    a plurality of hydrant apparatuses, each apparatus corresponding to a hydrant of the water distribution system, the hydrant apparatuses each including:
        a sensor configured to output sensor data relating to at least one operating parameter of the water distribution system;
        a processor in communication with the sensor;
        a local clock source;
        a communication interface; and
        a memory, wherein the memory includes instructions that when executed by the processor cause the apparatus to:
            receive the sensor data from the sensor;
            associate the sensor data with a first local clock time determined by the local clock source;
            obtain an external clock time from an external clock source; and
            determine an offset for the received sensor data based on a difference between the local clock time and the external clock time; and
    a central monitoring system in communication with each of the plurality of hydrant apparatuses via the respective communication interfaces of the plurality of hydrant apparatuses, wherein the central monitoring system is configured to, in response to a detected water system event, receive the respective sensor data, the respective local clock time associated with the sensor data and the respective offset from each of the plurality of hydrant apparatuses.

2. The remote monitoring system of claim 1, wherein the central monitoring system is further configured to determine normalized times for the sensor data from each of the hydrant apparatuses based on the respective offsets.

3. The remote monitoring system of claim 2, wherein the central monitoring system is further configured to identify a location of the water system event with respect to the plurality of hydrant apparatuses based on the normalized times for the sensor data from each of the hydrant apparatuses.

4. The remote monitoring system of claim 3, wherein the central monitoring system is further configured to identify the location based on one or more known locations associated with the plurality of hydrant apparatuses.

5. The remote monitoring system of claim 2, wherein the central monitoring system is further configured to measure a speed of the water system event based on the normalized times for the sensor data from each of the hydrant apparatuses.

6. The remote monitoring system of claim 2, wherein the central monitoring system is further configured to measure a change of a rate of propagation of the water system event based on the normalized times for the sensor data from each of the hydrant apparatuses.

7. The remote monitoring system of claim 2, wherein the central monitoring system is further configured to measure a rate of dissipation of the water system event based on the normalized times for the sensor data from each of the hydrant apparatuses.

8. The remote monitoring system of claim 2, wherein the central monitoring system is further configured to determine a cause of the water system event based on the normalized times for the sensor data from each of the hydrant apparatuses.

9. The remote monitoring system of claim 8, wherein the determination of the cause of the water system event comprises distinguishing between a plurality of potential causes based on the normalized times for the sensor data from each of the hydrant apparatuses.

10. The remote monitoring system of claim 9, wherein the determined cause of the potential causes comprises a usage spike, a pressure hammer, an accident, a leak, water theft, or pipe blockage.

11. The remote monitoring system of claim 2, wherein the central monitoring system is further configured to automatically compensate for the water system event based on the normalized times for the sensor data from each of the hydrant apparatuses.

12. The remote monitoring system of claim 11, wherein the automated compensation comprises changing a water pressure provided to a location associated with the water system event.

13. The remote monitoring system of claim 12, wherein the changing the water pressure comprises sending a signal to modify the operation of a valve or a booster pump of the water distribution system.

14. The remote monitoring system of claim 2, wherein the central monitoring system is further configured to provide a suggested action to a service operator based on the normalized times for the sensor data from each of the hydrant apparatuses.

15. The remote monitoring system of claim 1, wherein the memory further includes instructions that when executed by the processor cause each apparatus to determine a respective drift associated with the local clock source, wherein the offset of the hydrant apparatus associated with the local clock source is determined based on the respective drift.

16. The remote monitoring system of claim 1, wherein the sensor comprises a pressure sensor and the at least one operating parameter comprises pressure.

17. A method of monitoring a water distribution system via a plurality of hydrant apparatuses, the method comprising:
receiving, at each hydrant apparatus of the plurality of hydrant apparatuses, respective sensor data relating to at least one operating parameter of the water distribution system, each hydrant apparatus corresponding to a hydrant of the water distribution system, each hydrant apparatus of the plurality of hydrant apparatuses including a sensor configured to output the sensor data, a processor in communication with the sensor, a local clock source, and a communication interface;
associating, by each hydrant apparatus of the plurality of hydrant apparatuses, the respective sensor data with a first local clock time determined by the respective local clock source;
obtaining, by each hydrant apparatus of the plurality of hydrant apparatuses, an external clock time from an external clock source;
determining, by each hydrant apparatus of the plurality of hydrant apparatuses, a respective offset for the received sensor data based on a difference between the local clock time and the external clock time;
detecting, by a central monitoring system, a water system event;
transmitting, by each hydrant apparatus of the plurality of hydrant apparatuses, the respective sensor data, the respective local clock time and the respective offset to the central monitoring system in response to the detected water system event;
and
determining, by the central monitoring system, normalized times for the sensor data from each of the hydrant apparatuses based on the respective offsets for the respective sensor data.

18. The method of claim 17, further comprising identifying a location of the water system event with respect to the plurality of hydrant apparatuses based on the normalized times for the sensor data from each of the hydrant apparatuses.

19. The method of claim 17, further comprising measuring a change of a rate of propagation of the water system event based on the normalized times for the sensor data from each of the hydrant apparatuses.

20. The method of claim 17, further comprising determining a cause of the water system event based on the normalized times for the sensor data from each of the hydrant apparatuses, wherein determining the cause of the water system event comprises distinguishing between a plurality of potential causes based on the normalized times for the sensor data from each of the hydrant apparatuses.

* * * * *